United States Patent
Ferrer et al.

(10) Patent No.: US 11,021,039 B2
(45) Date of Patent: Jun. 1, 2021

(54) NOISE ATTENUATION FROM WAFFLE PATTERN AND TONGUE AND GROOVE COUPLING FOR FRONT OF DASH

(71) Applicant: Hanon Systems, Daejeon (KR)

(72) Inventors: Jhonatan Ferrer, Ann Arbor, MI (US); Chad Engberg, Dearborn, MI (US)

(73) Assignee: HANON SYSTEMS, Daejeon (KR)

( * ) Notice: Subject to any disclaimer, the term of this patent is extended or adjusted under 35 U.S.C. 154(b) by 180 days.

(21) Appl. No.: 15/788,923

(22) Filed: Oct. 20, 2017

(65) Prior Publication Data

US 2019/0118612 A1  Apr. 25, 2019

(51) Int. Cl.
*B60H 1/00* (2006.01)

(52) U.S. Cl.
CPC ..... *B60H 1/00528* (2013.01); *B60H 1/00564* (2013.01); *B60H 1/00571* (2013.01); *B60H 2001/006* (2013.01); *B60H 2001/00635* (2013.01)

(58) Field of Classification Search
CPC ............ B60H 1/00528; B60H 1/00564; B60H 1/00571; B60H 2001/006; B60H 2001/00635
See application file for complete search history.

(56) References Cited

U.S. PATENT DOCUMENTS

| | | | | |
|---|---|---|---|---|
| 4,067,204 A * | 1/1978 | Riello | ..................... | F24F 1/027 62/262 |
| 5,193,609 A * | 3/1993 | Cowart | ................ | B60H 1/3229 165/122 |
| 5,354,101 A * | 10/1994 | Anderson, Jr. | ......... | F16L 39/00 285/25 |
| 5,899,505 A * | 5/1999 | Tsunoda | ............. | B60H 1/00571 285/124.1 |
| 6,386,966 B1 * | 5/2002 | Kuwayama | ........ | B60H 1/00514 181/225 |
| 6,814,182 B2 | 11/2004 | Dausch | | |
| 6,981,386 B2 * | 1/2006 | Young | .................... | B60K 11/06 181/224 |
| 7,481,703 B2 * | 1/2009 | Okumura | ........... | B60H 1/00514 454/121 |
| 8,166,775 B2 * | 5/2012 | Choi | .................. | B60H 1/00564 181/224 |
| 8,186,719 B2 * | 5/2012 | Kume | ................... | F28D 1/0341 165/176 |
| 8,430,365 B2 * | 4/2013 | Benoit | ...................... | F16L 5/14 248/49 |
| 9,644,740 B2 * | 5/2017 | Gorski | .................. | B62D 25/24 |
| 9,844,997 B2 * | 12/2017 | Baek | .................. | B60H 1/00557 |

(Continued)

FOREIGN PATENT DOCUMENTS

| | | |
|---|---|---|
| KR | 20090062418 A | 6/2009 |
| KR | 20170008902 A | 1/2017 |
| WO | 2014172008 A1 | 10/2014 |

*Primary Examiner* — Avinash A Savani
*Assistant Examiner* — Martha M Becton
(74) *Attorney, Agent, or Firm* — Shumaker, Loop & Kendrick, LLP; James D. Miller

(57) ABSTRACT

A seal assembly of an air handling system includes a housing formed by a first housing portion coupled to a second housing portion. The first housing portion has a plurality of ribs formed in a waffle pattern. The housing receives a portion of the fluid conduits. A seal engages an outer surface of the housing and receives the fluid conduits.

16 Claims, 6 Drawing Sheets

(56) References Cited

U.S. PATENT DOCUMENTS

| | | | |
|---|---|---|---|
| 10,864,795 B2* | 12/2020 | Kim | F16L 5/02 |
| 2004/0185765 A1* | 9/2004 | Yamaguchi | B60H 1/00849 |
| | | | 454/139 |
| 2005/0076668 A1* | 4/2005 | Choi | B60H 1/00564 |
| | | | 62/404 |
| 2005/0109885 A1* | 5/2005 | Welsh | F16L 59/02 |
| | | | 248/56 |
| 2006/0130774 A1* | 6/2006 | Chiang | A01K 1/03 |
| | | | 119/455 |
| 2006/0230774 A1* | 10/2006 | Shibata | B60H 1/00521 |
| | | | 62/239 |
| 2006/0288722 A1* | 12/2006 | Okumura | B60H 1/00514 |
| | | | 62/239 |
| 2009/0090579 A1* | 4/2009 | Nishida | B60H 1/00571 |
| | | | 181/255 |
| 2009/0107059 A1 | 4/2009 | Kipp et al. | |
| 2009/0200756 A1* | 8/2009 | Yamamoto | B60H 1/00571 |
| | | | 277/616 |
| 2016/0313015 A1* | 10/2016 | Uhlenbusch | B60H 1/34 |
| 2016/0377177 A1* | 12/2016 | Gorski | F16J 15/062 |
| | | | 296/208 |
| 2019/0063646 A1* | 2/2019 | Bopp | F16L 37/1225 |
| 2021/0001684 A1* | 1/2021 | Tominaga | B60H 1/00328 |

* cited by examiner

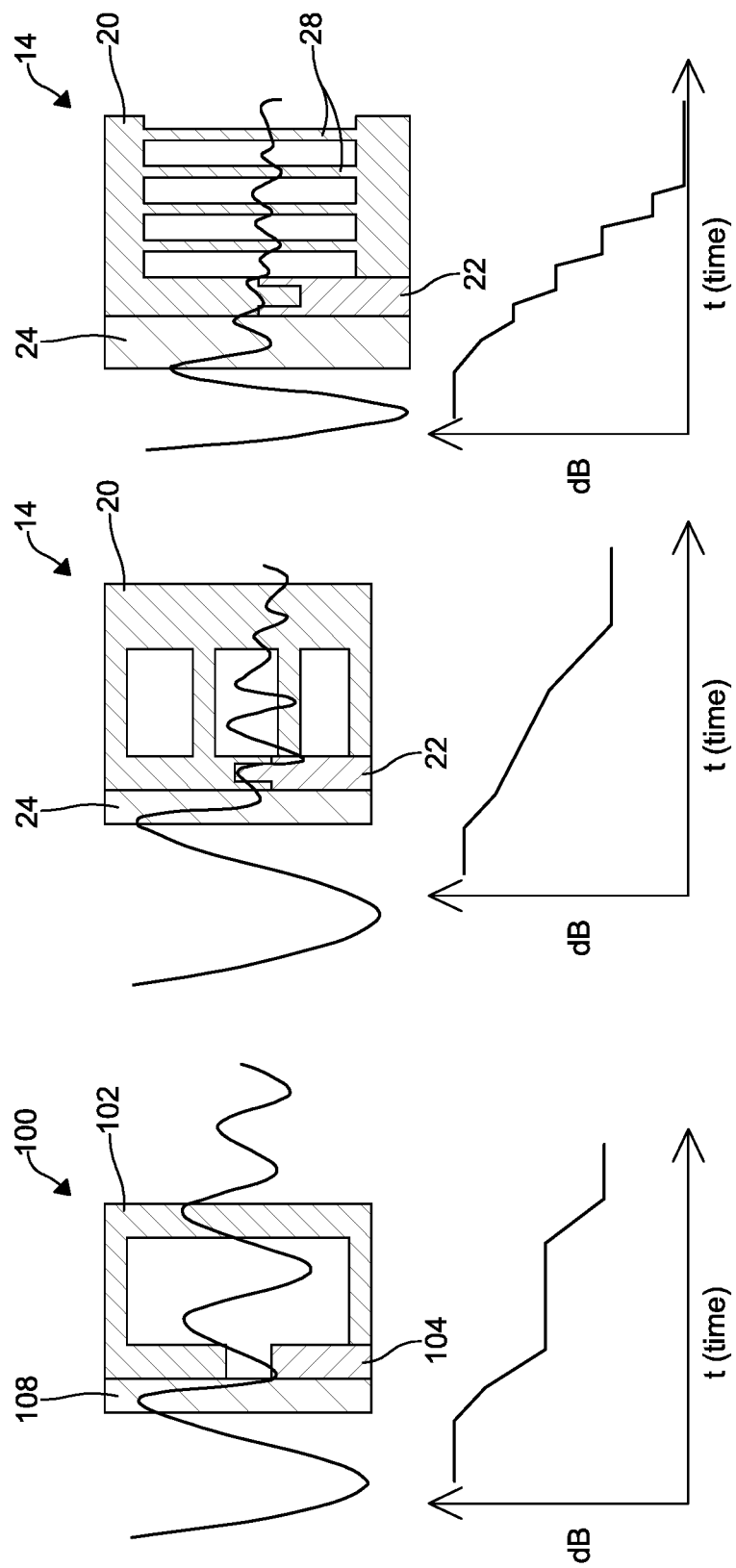

NOISE ATTENUATION FROM WAFFLE PATTERN AND TONGUE AND GROOVE COUPLING FOR FRONT OF DASH

FIELD OF THE INVENTION

The invention relates generally to a heating, ventilating, and air conditioning (HVAC) air handling system for a motor vehicle, and more particularly, to a sealing structure of the HVAC air handling system configured to receive fluid lines for communicating a fluid between an interior and an exterior of a housing of the HVAC air handling system.

BACKGROUND

A vehicle typically includes a climate control system which maintains a temperature within a passenger compartment of the vehicle at a comfortable level by providing heating, cooling, and ventilation. Comfort is maintained in the passenger compartment by an integrated mechanism referred to in the art as a heating, ventilation and air conditioning (HVAC) air handling system. The air handling system conditions air flowing therethrough and distributes the conditioned air throughout the passenger compartment.

The air handling system commonly employs a housing including one or more heat exchangers for conditioning the air passing through the air handling system. The air handling system may for example include an evaporator associated with a refrigeration circuit of the air handling system for cooling and dehumidifying the air. The air handling system may further include a heating heat exchanger for heating the air passing through the air handling system. The heating heat exchanger may be a condenser associated with the refrigeration circuit or a radiator associated with a coolant system of the motor vehicle.

The heat exchangers are typically contained within an interior of the housing while additional components of the refrigeration circuit or the coolant system of the motor vehicle are disposed exterior to the housing, thereby requiring any fluids associated with the heat exchangers to be fed through one or more openings formed in an exterior portion of the housing. Each opening formed in the housing accordingly requires sealing to prevent the ingress or egress of fluids into or out of the housing.

To accomplish sealing, sealing components such as housings, seals, and other components are formed exterior to the housing adjacent to or about conduits and openings providing the communication of fluids to the HVAC. The sealing components are typically positioned proximate a passenger compartment adjacent or interfacing a piece of sheet metal, for example. However, the sealing components according to prior art typically do not militate against noise and vibrations from the atmosphere external to the vehicle such as from the road the vehicle is traveling on, air flowing through the HVAC or an engine compartment of the vehicle, and other noise and vibrations caused by other components of the vehicle or from the environment external to the vehicle.

For example, FIG. 6 is a schematic illustration of a sealing assembly 100 according to prior art. The sealing assembly 100 includes a first housing component 102 coupled to or engaging a second housing component 104. A seal 108 engages the housing components 102, 104. The first housing component 102 is hollow resulting in minimized sound transmission loss (STL) and permits unfavorable quantities of sound or noise to enter the passenger compartment. The unfavorable quantities of sound or noise are due inadequate sound attenuation because the sealing assembly 100 typically includes minimal features to absorb energy of sound waves traveling therethrough.

It would therefore be desirable to produce a sealing assembly configured to maximize sound attenuation and sound transmission loss while providing an efficient seal to prevent the ingress and egress of fluids from the housing.

SUMMARY OF THE INVENTION

In accordance and attuned with the present invention, a sealing assembly configured to maximize sound attenuation and sound transmission loss while providing an efficient seal to prevent the ingress and egress of fluids from the housing has been surprisingly been discovered.

In one embodiment of the invention, a seal assembly of an air handling system is disclosed. The seal assembly includes a housing formed by a first housing portion and a second housing portion. The first housing portion has a plurality of ribs formed in a waffle pattern. The housing receives a portion of fluid conduits of the air handling system. A seal engages an outer surface of the housing and receives the fluid conduits.

According to another embodiment of the invention, a seal assembly of an air handling system is disclosed. The seal assembly includes a first housing portion having a plurality of ribs formed in a waffle pattern. The plurality of ribs extends substantially parallel with a height direction of the first housing portion. A second housing portion is coupled to the first housing portion to form a housing for receiving and sealing a fluid conduit. The housing is disposed exterior to an enclosure of the air handling system. A seal engages an outer surface of the housing.

According to yet another embodiment of the invention, an air handling system of a vehicle is disclosed. The air handling system includes an enclosure having an interior configured to receive air handling system components and an exterior. A fluid conduit extends from the exterior of the enclosure to the interior of the enclosure. The fluid conduit is configured to convey a fluid. A housing is disposed exterior to the enclosure and encloses and seals a portion of the fluid conduit. The housing is formed from a first housing portion coupled to a second housing portion. The first housing portion has a plurality of ribs and a lip formed thereon. The second housing portion has a groove formed therein. The groove is configured to engage the lip. A seal engages an outer surface of the housing.

BRIEF DESCRIPTION OF THE DRAWINGS

FIG. 6 is a schematic illustration of a seal, a first housing portion, and a second housing portion of a seal assembly according to prior art and an associated graph illustrating an example of sound in decibels versus time as sound travels through the seal assembly according to prior art;

FIG. 7A is a schematic illustration of a seal, a first housing portion, and a second housing portion of a seal assembly according to an alternate embodiment of the instant disclosure and an associated graph illustrating an example of sound in decibels versus time as sound travels through the seal assembly according an alternate embodiment of the present disclosure; and FIG. 7B is a schematic illustration of a seal, a first housing portion, and a second housing portion of the seal assembly of FIG. 1 of the instant disclosure and an associated graph illustrating an example of sound in decibels versus time as sound travels through the seal assembly according to FIG. 1.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
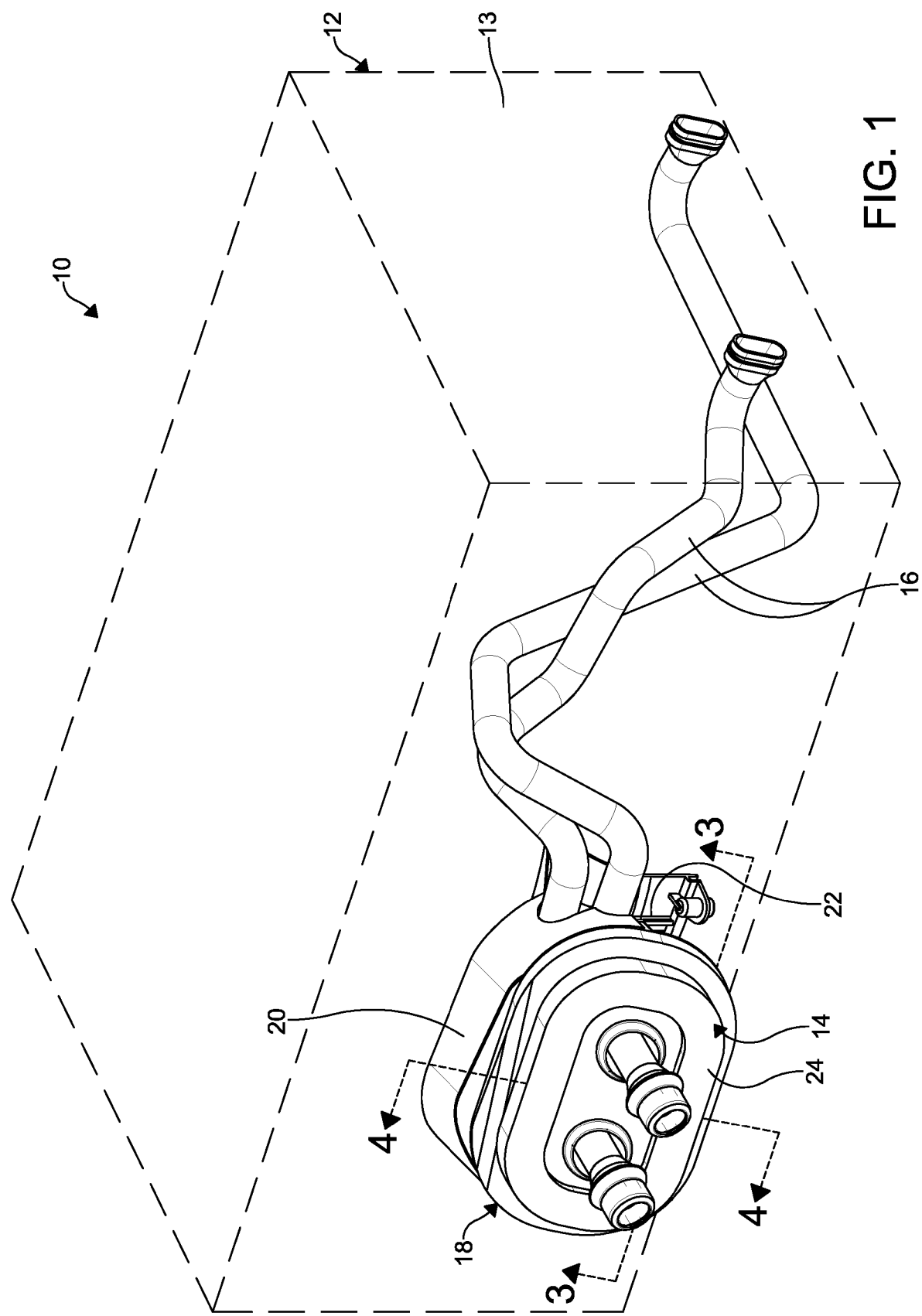
FIG. 1 is top perspective view of air handling system of a heating, ventilation and air conditioning (HVAC) including a housing, fluid conduits, and a seal assembly according to an embodiment of the present disclosure.

FIG. 1 illustrates an air handling system 10 of a heating, ventilating, and air conditioning (HVAC) system of a vehicle including an enclosure 12 (schematically represented by the dashed lines) of the air handling system 10, a seal assembly 14, and fluid conduits 16.

The enclosure 12 includes various components (not shown) associated with operation of the air handling system 10 disposed therein. The enclosure 12 may for example include an evaporator (not shown) and a heater core (not shown). The evaporator and heater core may form a portion of a refrigerant circuit having components such as a compressor (not shown). The heater core may be a condenser of the refrigerant circuit, a radiator forming a portion of a cooling system of an engine or battery of the motor vehicle, or an electrically powered device. Any combination of components associated with operation of the air handling system 10 may be disposed within or exterior to the enclosure 12 without departing from the scope of the present invention.

The enclosure 12 is shown as including an outer wall 13 forming a boundary between an interior of the housing and an exterior thereof. The enclosure 12 is shown in FIG. 1 as having a cuboidal shape for illustrative purposes, however the enclosure 12 can have any shape as desired such as an irregular or regular three-dimensional shape configured to suitably package various components of the air handling system 10 within the enclosure 12 in a space efficient manner. The outer wall 13 of the enclosure 12 may be formed from any suitable rigid material such as plastic, for example.

The seal assembly 14 is disposed exterior to the enclosure 12. The fluid conduits 16 extend from a fluid source (not shown) exterior to the enclosure 12 to one of the components interior to the enclosure 12. The fluid conduits 16 are configured to receive a fluid such as a coolant, refrigerant, water, or other fluid commonly used in air handling systems. The fluid conduits 16 may, for example, form a portion of the refrigerant circuit having the evaporator and/or the condenser and may be configured to circulate a refrigerant of the refrigerant circuit through one of the evaporator or the condenser within the interior of the enclosure 12. The fluid conduits 16 may alternatively form a portion of a cooling system of the motor vehicle and may be configured to circulate a coolant of the cooling system through the heater core within the interior of the enclosure 12. One skilled in the art should understand that the fluid conduits 16 may form a portion of any system associated with operation of the air handling system 10 requiring communication of a fluid between the interior and the exterior of the enclosure 12, as desired, without departing from the scope of the present invention. In the embodiment illustrated, two of the fluid conduits 16 are shown. However, it is understood, more than two or fewer than two fluid conduits 16 can be employed, if desired. The fluid conduits 16 extend through the seal assembly 14.

Figure 2:
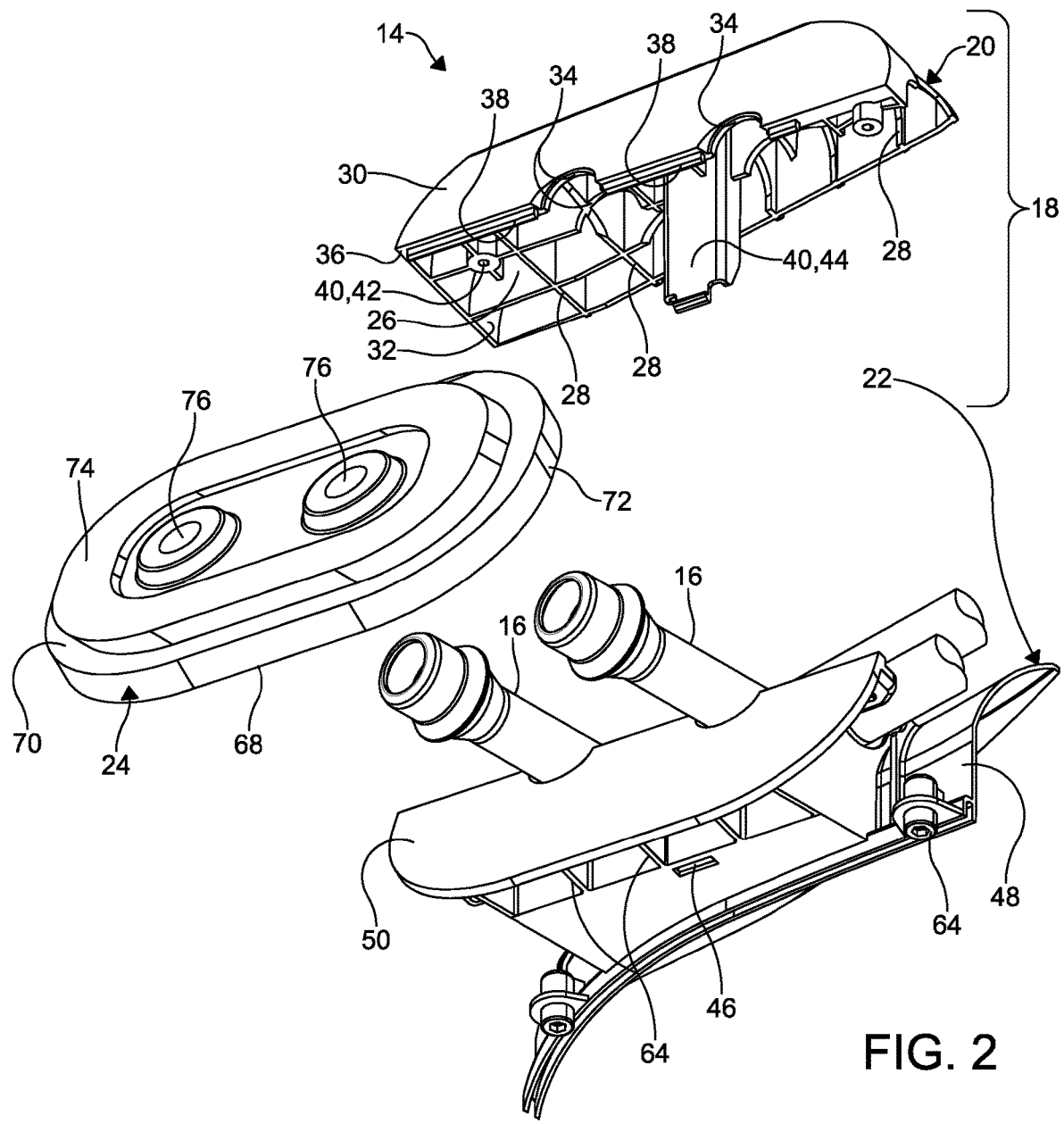
FIG. 2 is a partially exploded bottom perspective view of the seal assembly and fluid conduits of FIG. 1.
Figure 3:
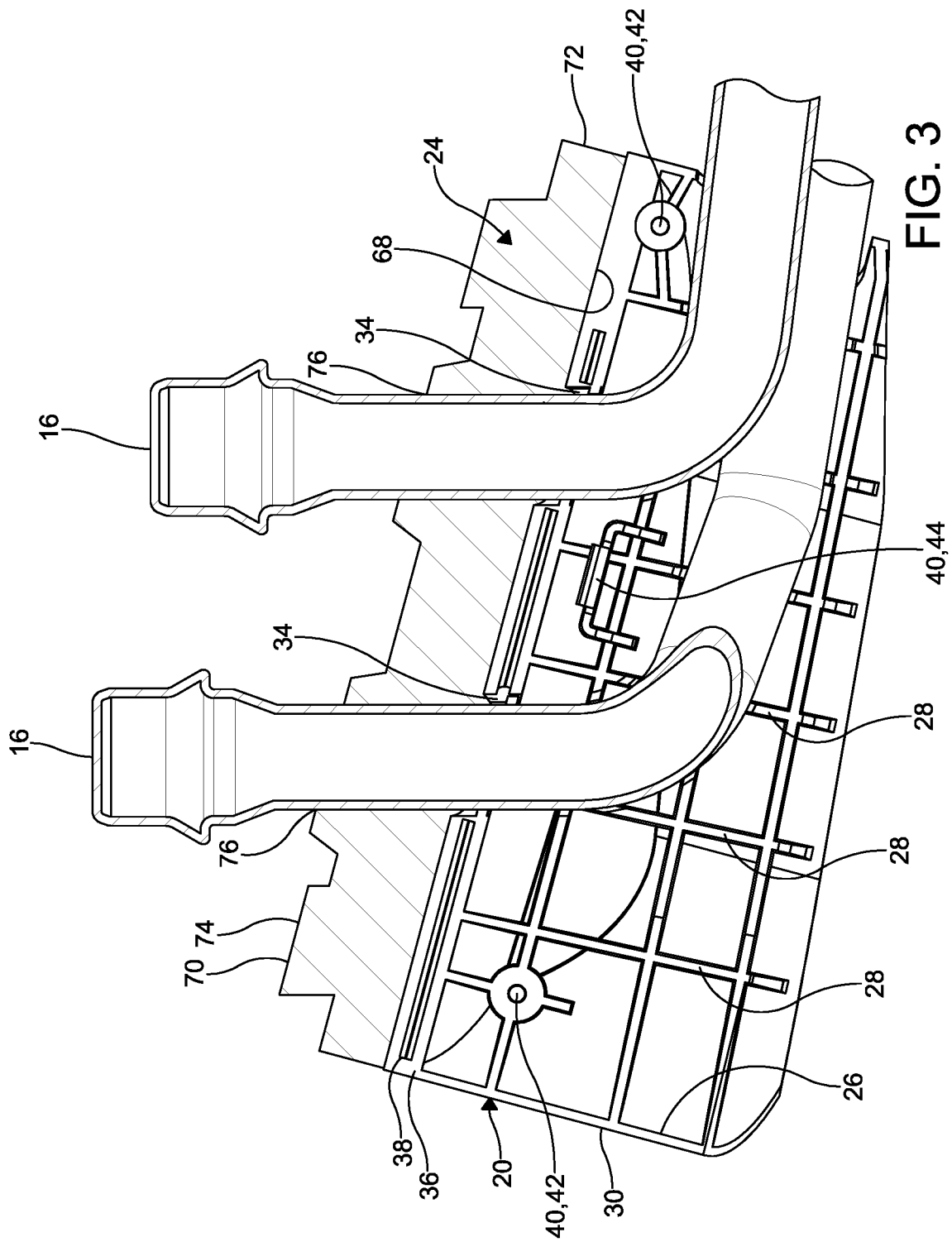
FIG. 3 is a cross-sectional elevational view of a portion of the seal assembly and fluid conduits of FIG. 1 taken through section lines 3-3.
Figure 4:
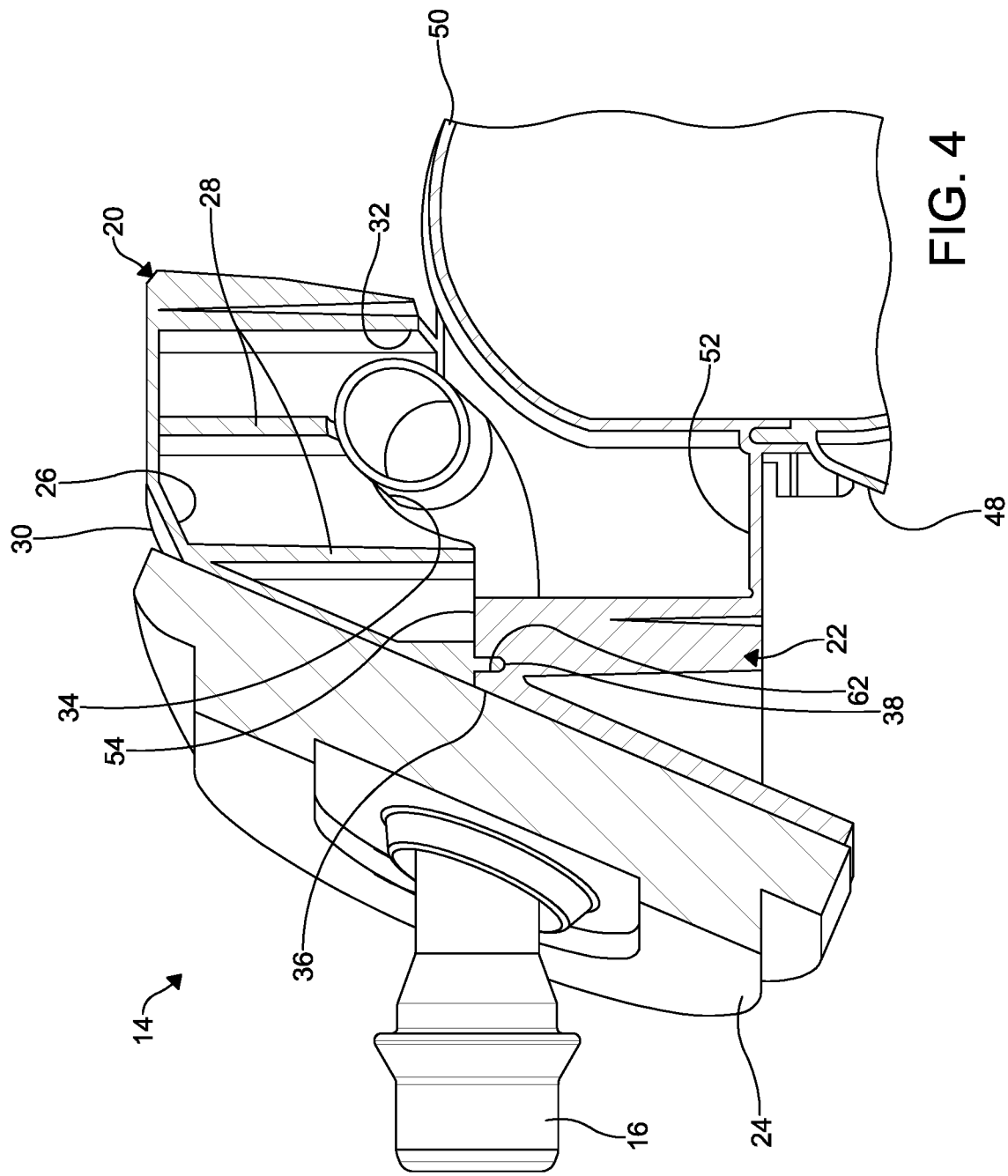
FIG. 4 is a cross-sectional elevational view of a portion of the seal assembly and fluid conduits of FIG. 1 taken through section lines 4-4.
Figure 5:
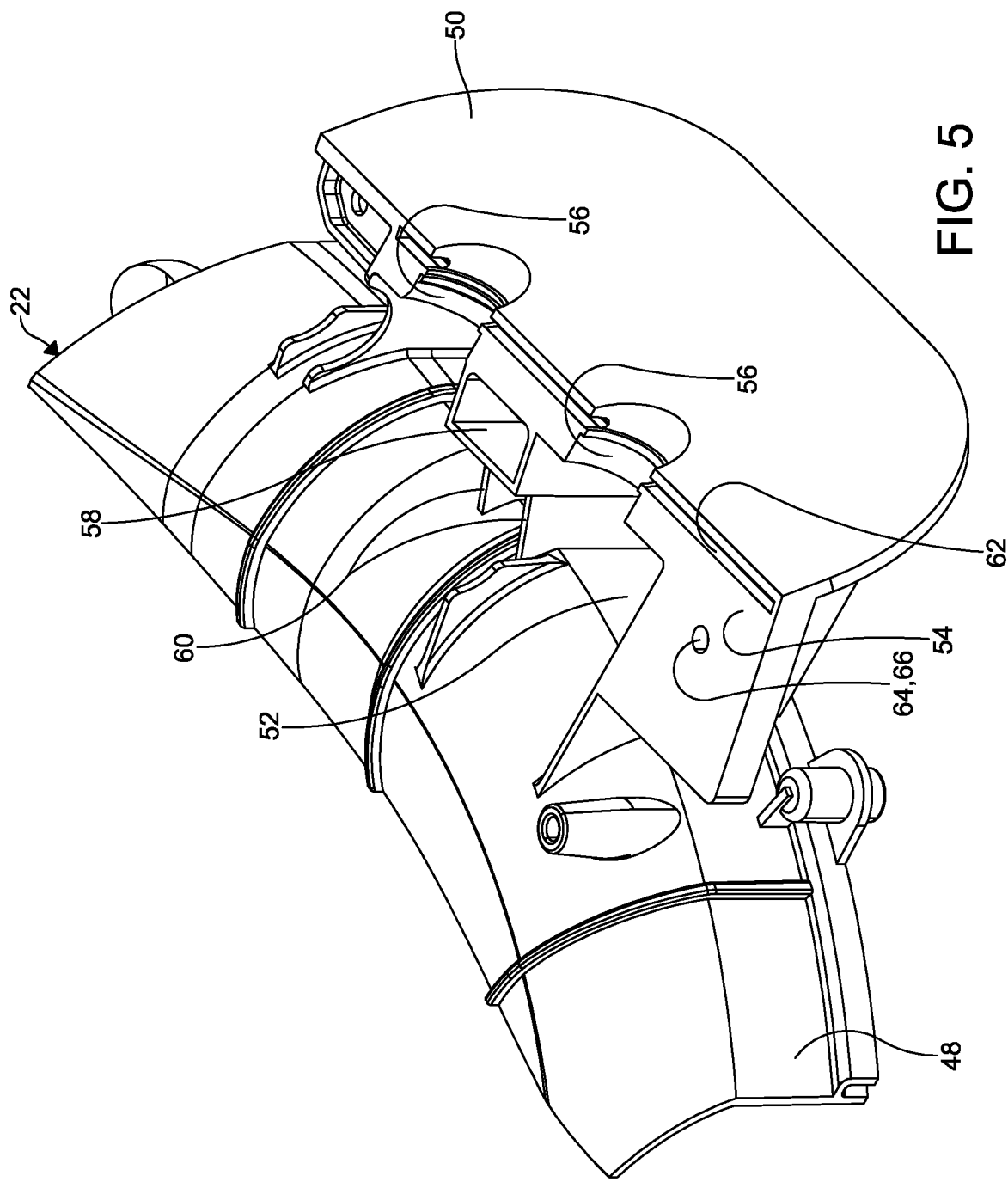
FIG. 5 is a top perspective view of a second housing portion of the seal assembly of FIG. 1.

As shown in FIGS. 1-5, the seal assembly 14 includes a housing 18 formed from a first housing portion 20 and a second housing portion 22. The first housing portion 20 has an outer wall 30 defining an opening 32 and a hollow chamber 26. As shown, the first housing portion 20 has a substantially rectangular cross-sectional shape. However, it is understood the first housing portion 20 can have any cross-sectional shape as desired such as substantially circular, substantially ovular, or substantially irregular shape, depending on the air handling system 10. The chamber 26 includes a plurality of ribs 28 arranged in a "waffle" or lattice pattern. As used herein, a waffle pattern or lattice pattern refers to intersecting strips of the ribs 28, wherein the ribs 28 define hollow columns having a rectangular, square, or diamond cross-sectional shape therebetween as illustrated in FIGS. 2-3. However, it is understood other configurations and patterns can be contemplated. For example, the ribs 28 can define hollow columns having a "honeycomb" pattern, wherein the hollow columns have a substantially hexagon cross-sectional shape. The hollow columns can have other cross-sectional shapes such as circular, triangular, irregularly shaped, or any other similar shape. The ribs 28 extend in a direction substantially transverse to a direction of travel of longitudinal sound waves travelling through the seal assembly 14 or parallel to a direction of energy transport through the seal assembly 14. For example, the ribs 28 extend substantially parallel to a height direction of the first housing portion 20 or transverse to a direction of the fluid conduits 16 extending through the seal assembly 14. As shown, the ribs 28 are integrally formed with the first housing portion 20 during a molding process. Although, it is understood, the ribs 28 can be separately formed and coupled to the first housing portion 20 or formed by a different process, if desired. The ribs 28 extend along an entirety of the hollow chamber 26. Although, the ribs 28 can extend only through a portion of the hollow chamber 26 depending on the application or configuration of the air handling system 10.

The first housing portion 20 includes recesses 34 formed therein. Particularly, the recesses 34 are formed in a portion of the ribs 28 and an edge 36 of the first housing portion 20 to receive a portion of the fluid conduits 16. The edge 36 of the first housing portion 20 defines the opening 32. A lip 38 is formed along a portion of the edge 36 adjacent the seal 24. However, the lip 38 can be formed along any portion of the edge 36, if desired.

The first housing portion 20 also includes coupling features 40 configured for coupling the first housing portion 20 to the second housing portion 22. For example, as shown, the coupling features 40 include holes 42 and a snap-fit protuberance 44. The holes 42 are configured for receiving a pin or projection formed on the second housing portion 22. The snap-fit protuberance 44 is configured to be received in, and engaged by an interference fit, a slot 46 formed in the second housing portion 22. The coupling features 40 also facilitate alignment of the first housing portion 20 with the second housing portion 22. It is understood, other types of coupling features such as bolts, clamps, and adhesives, for example, can be employed if desired.

In certain embodiments, the second housing portion 22 is integrally formed with the enclosure 12 of the air handling system 10. In the embodiment shown, the second housing 22 is separately formed from the enclosure 12 of the air handling system 10 and coupled thereto with a bracket 48. The second housing portion 22 has an outer surface 50, an inner recessed surface 52, and a rim 54 bordering the inner recessed surface 52. Recesses 56 are formed in the rim 54 to receive and support the fluid conduits 16. The recesses 56 of the second housing portion 22 align with the recesses 34 of the first housing portion 20 to form openings for the fluid conduits 16 when the first housing 20 is coupled to the second housing portion 22. A hollow partition 58 extends from the inner recessed surface 52 to receive the snap-fit protuberance 44. The slot 46 is formed in the inner recessed surface 52 within the perimeter of the hollow partition 58.

The second housing portion 22 further includes ribs 60 extending from the inner recessed surface 52. The ribs of the second housing portion 22 provide mechanical support to the second housing portion 22. The ribs 60 may be included on the outer surface 50 of the second housing portion 22 to mechanically strengthen portions of the second housing portion 22.

A groove 62 having a shape corresponding to the lip 38 of the first housing portion 20 is formed in the rim 54 of the second housing portion 22. The groove 62 aligns with the lip 38 of the first housing portion 20. Particularly, the groove 62 is formed in the rim 54 at a portion furthest from the enclosure 12 of the air handling system 10. Coupling features 64 are also formed on the second housing portion 22 configured for coupling the first housing portion 20 to the second housing portion 22. The coupling features 64 includes the slot 46 and holes 66 for receiving a pin, protuberance, or bolt.

The seal 24 generally includes a main body formed from a resilient and elastically deformable material. The seal 24 may be formed from a polymeric material, and more specifically an elastomer such as ethylene propylene diene monomer (EPDM) rubber. Alternative materials having the requisite characteristics of resiliency and elastic deformability may be used for forming the seal 24 without departing from the scope of the present invention. The seal 24 may be formed by a molding process, but any suitable material and manufacturing process may be used in forming the seal 24 without departing from the scope of the present invention.

The seal 24 includes a first face 68 configured to be in facing relationship with the housing 18 and an opposing second face 70 configured to face opposite the enclosure 12. A perimeter 72 of the seal 24 is shown as being substantially elliptical, but the perimeter 72 of the seal 24 may have any shape without departing from the scope of the present invention, including a circular shape, an ovular shape, a rectangular shape, and an irregular shape, as non-limiting examples, so long as the perimeter 72 of the seal 24 forms a closed shape for surrounding any openings in need of sealing.

A projection 74 having a substantially elliptical cross-sectional shape projects outwardly from the second face 70 of the seal 24 and away from the enclosure 12. The projection 74 follows a closed shape substantially corresponding to a shape of the perimeter 72 of the seal 24. Although, in other embodiments, the projection 74 can have a shape different from the shape of the perimeter 72 of the seal 24.

Fluid ports 76 for receiving one of the fluid conduits 16 are formed through the projection 74 and thus, through the seal 24. The seal 24 is shown as having two of the fluid ports 76, but the seal 24 may have any number of the fluid ports 76 without departing from the scope of the present invention. The two fluid ports 76 may for example include an inlet port and a outlet ports, wherein the inlet port is configured for communicating the fluid from the exterior of the enclosure 12 to the interior of the enclosure 12 and the outlet port is configured for communicating the fluid from the interior of the enclosure 12 to the exterior of the enclosure 12. Each of the fluid conduits 16 may be sealed to the seal 24 using any known form of seal assembly 14, as desired, without departing from the scope of the present invention.

To assemble the seal assembly 14, the second housing portion 22 is coupled to the enclosure 12 of the air handling system 10 with the bracket 48. In an alternate embodiment, the second housing portion 22 is integrally formed with the enclosure 12 of the air handling system 10. The recesses 56 of the second housing portion 22 receive the fluid conduits 16. The first housing portion 20 is coupled to second housing portion 22 wherein the recesses 34 of the first housing portion 20 align with the recesses 56 of the second housing portion 22 to receive and enclose a portion of the fluid conduits 16. The lip 38 of the first housing portion 20 engages the groove 62 of the second housing portion 22. The coupling features 40 of the first housing portion 20 engage the coupling features 64 of the second housing portion 22. The first housing portion 20 and the second housing portion 22 form the housing 18. The seal 24 is then positioned in engagement with an outer surface of the housing 18. The fluid ports 76 receive the fluid conduits 16 therethrough.

FIG. 6 is a schematic illustration showing a sound wave travelling through the sealing assembly 100 according to prior art and a corresponding sound versus time line graph. FIG. 7A is a schematic illustration showing a sound wave travelling through the seal assembly 14 according to the present disclosure and a corresponding sound versus time line graph according to an alternate embodiment of the disclosure which will be described in more detail herein below. FIG. 7B is a schematic illustration showing a sound wave travelling through the seal assembly 14 according to the present disclosure and a corresponding sound versus time line graph. As can be shown in 7B, the sound traveling through the seal assembly 14 of the present invention dissipates at a faster rate than the sound traveling through the sealing assembly 100 of prior art. The lip 38 engaging the groove 62 militates against the opening formed between the first housing component 102 and the second housing component 104 of prior art and acts as a barrier to dissipate the sound travelling through the seal assembly 14 of the present disclosure.

The ribs 28 act as a sound trap configured to absorb sound and to significantly reduce sound transmission across the seal assembly 14. In general, sound waves entering the seal assembly 14 are attenuated by the ribs 28 with acoustic reflection. The ribs greatly increase the sound attenuation properties of the seal assembly 14. Sound waves impinging on the ribs 28 and the lip 38 and groove 62 exhibit reduced acoustic reflection as compared to a seal assembly lacking such ribs and lip and groove configuration. As a result, sound waves are more effectively absorbed and attenuated by the ribs 28 and the lip 38 and groove 62. The ribs 28 and the lip 38 and the groove 62 increase surface exposure of the sound traveling through the seal assembly 14, and thus, sound attenuation is increased.

It should be understood alternate configurations of the ribs 28 can be contemplated. For example, as shown in FIG. 7A the ribs 28 can extend in a directions substantially parallel to a direction of the sound waves traveling through the seal assembly 14, wherein the ribs 28 are substantially parallel to a width direction of the first housing portion 20 or in a direction parallel to a direction from the furthest portion of the seal assembly 14 from the enclosure 12 to the enclosure 12.

FIG. 7A is a schematic illustration showing a sound wave travelling through the seal assembly 14 according to the present disclosure and a corresponding sound versus time line graph, wherein the ribs 28 extend substantially parallel to a direction of the sound waves traveling through the seal assembly 14. As can be shown, the sound traveling through the seal assembly 14 of the present invention dissipates at a faster rate than the sound traveling through the sealing assembly 100 of prior art.

In use, the substantially planar second face 70 of the seal 24 may be placed in abutment with a panel such as sheet metal for example or other portion of the vehicle. In other embodiments, seal 24 may not be in abutment with any component of the vehicle.

Advantageously, the seal assembly 14 according to the present disclosure facilitates higher sound transmission loss than prior art seal assemblies. Accordingly, less noise is experienced by passengers in the passenger compartment of the vehicle.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A seal assembly of an air handling system of a vehicle comprising:
   a housing formed by a first housing portion and a second housing portion, the first housing portion having a plurality of ribs, the housing receiving a portion of fluid conduits of the air handling system;
   wherein the first housing portion has recesses formed therein for receiving the fluid conduits and the second housing portion has recesses formed therein for receiving the fluid conduits;
      wherein the recesses of the first housing portion cooperate with the recesses of the second housing portion to form cylindrical openings through the housing for receiving the fluid conduits; and
   a seal engaging an outer surface of the housing and receiving the fluid conduits, wherein the plurality of ribs is arranged in a waffle pattern defining a plurality of columns through the first housing portion, wherein each of the columns extends through the first housing portion in a direction transverse to a direction of passage of the fluid conduits through the seal.

2. The seal assembly of claim 1, wherein the housing is disposed exterior to an enclosure of the air handling system.

3. The seal assembly of claim 1, wherein at least a first one of the plurality of ribs is disposed on a plane arranged transverse to a direction of passage of the fluid conduits through the seal.

4. The seal assembly of claim 1, wherein at least a first one of the plurality of ribs is disposed on a plane arranged substantially parallel to a direction of passage of the fluid conduits through the seal.

5. The seal assembly of claim 1, wherein the first housing portion has an edge defining an opening, the edge including a lip formed thereon.

6. The seal assembly of claim 5, wherein the second housing portion has an inner recessed portion and a rim bordering the inner recessed portion, the rim including a groove formed therein, the groove receiving the lip of the first housing portion.

7. The seal assembly of claim 1, wherein the seal has a perimeter substantially elliptical in shape.

8. The seal assembly of claim 1, wherein the first housing portion and the second housing portion each have coupling features configured to couple the first housing portion to the second housing portion.

9. The seal assembly of claim 8, wherein the coupling features of the first housing portion include holes and a snap-fit protuberance and the coupling features of the second housing portion include a slot for engaging the snap fit protuberance and holes.

10. The seal assembly of claim 1, wherein the second housing portion includes a bracket for coupling to an enclosure of the air handling system.

11. The seal assembly of claim 1, wherein the plurality of ribs extend through an entirety of a hollow chamber formed in the first housing portion.

12. A seal assembly of an air handling system of a vehicle comprising:
   a first housing portion having a plurality of ribs, the plurality of ribs extending substantially parallel with a height direction of the first housing portion;
   a second housing portion coupled to the first housing portion to form a housing for receiving and sealing a fluid conduit, the housing disposed exterior to an enclosure of the air handling system;
   wherein the first housing portion has recesses formed therein for receiving the fluid conduits and the second housing portion has recesses formed therein for receiving the fluid conduits;
      wherein the recesses of the first housing portion cooperate with the recesses of the second housing portion to form cylindrical openings through the housing for receiving the fluid conduits; and
   a seal engaging an outer surface of the housing, wherein the plurality of ribs is arranged in a waffle pattern defining a plurality of columns through the first housing portion, wherein each of the columns extends through the first housing portion in the height direction of the first housing portion, wherein the height direction of the first housing portion is arranged transverse to a direction of passage of the fluid conduit through the seal.

13. The seal assembly of claim 12, wherein the seal is formed from a resilient and elastically deformable material.

14. The seal assembly of claim 12, wherein the second housing portion includes a bracket for coupling to enclosure of the air handling system.

15. The seal assembly of claim 12, wherein the first housing portion has a lip formed thereon engaging a groove formed in the second housing portion.

16. An air handling system of a vehicle comprising:
   an enclosure having an interior configured to receive air handling system components and an exterior;

a fluid conduit extending from the exterior of the enclosure to the interior of the enclosure, the fluid conduit configured to convey a fluid;

a housing disposed exterior to the enclosure and enclosing and sealing a portion of the fluid conduit, the housing formed from a first housing portion coupled to a second housing portion, the first housing portion having a plurality of ribs and a lip formed thereon, the second housing portion having a groove formed therein, the groove configured to engage the lip;

wherein the first housing portion has recesses formed therein for receiving the fluid conduits and the second housing portion has recesses formed therein for receiving the fluid conduits;

wherein the recesses of the first housing portion cooperate with the recesses of the second housing portion to form cylindrical openings through the housing for receiving the fluid conduits; and a seal engaging an outer surface of the housing, wherein the plurality of ribs is arranged in a waffle pattern defining a plurality of columns through the first housing portion, wherein each of the columns extends through the first housing portion in a direction transverse to a direction of passage of the fluid conduit through the seal.

* * * * *